United States Patent Office 2,801,708
Patented Aug. 6, 1957

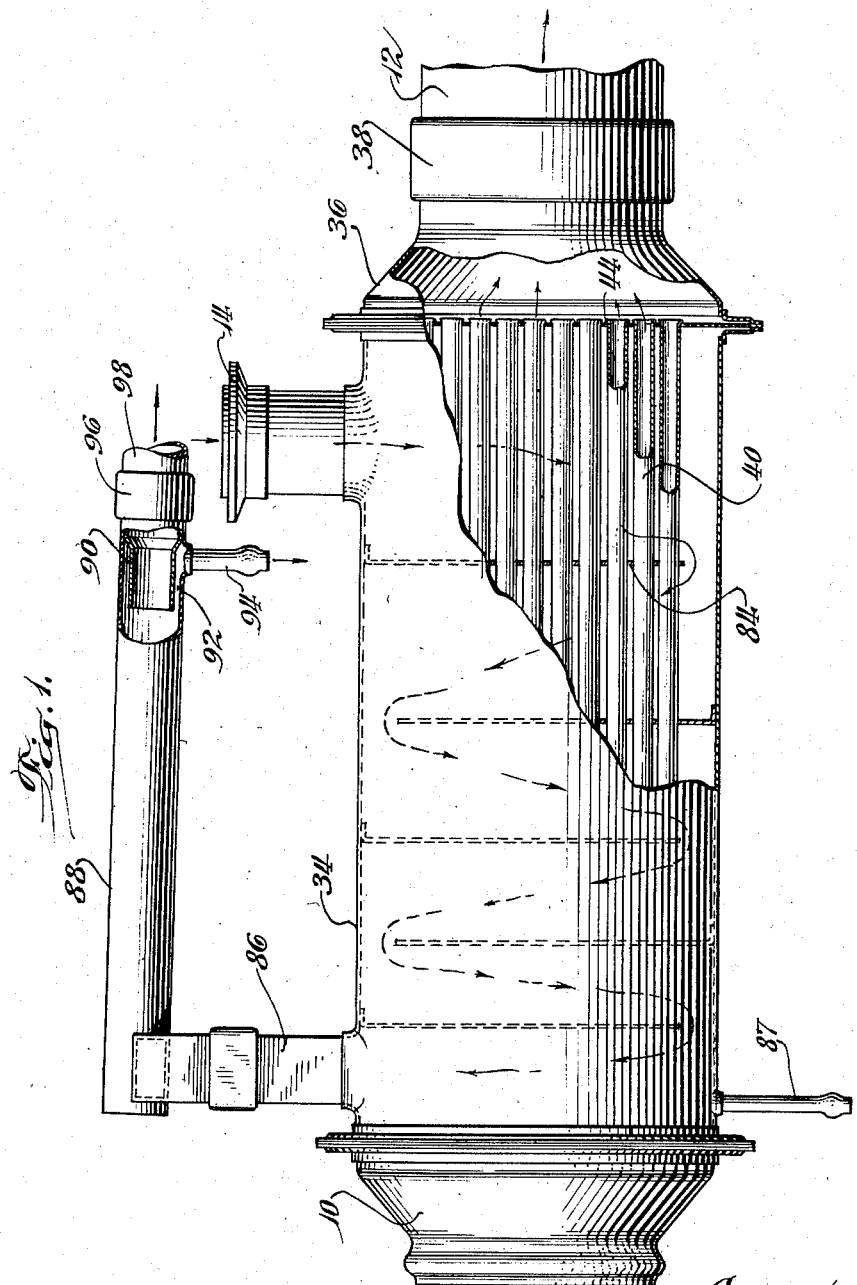

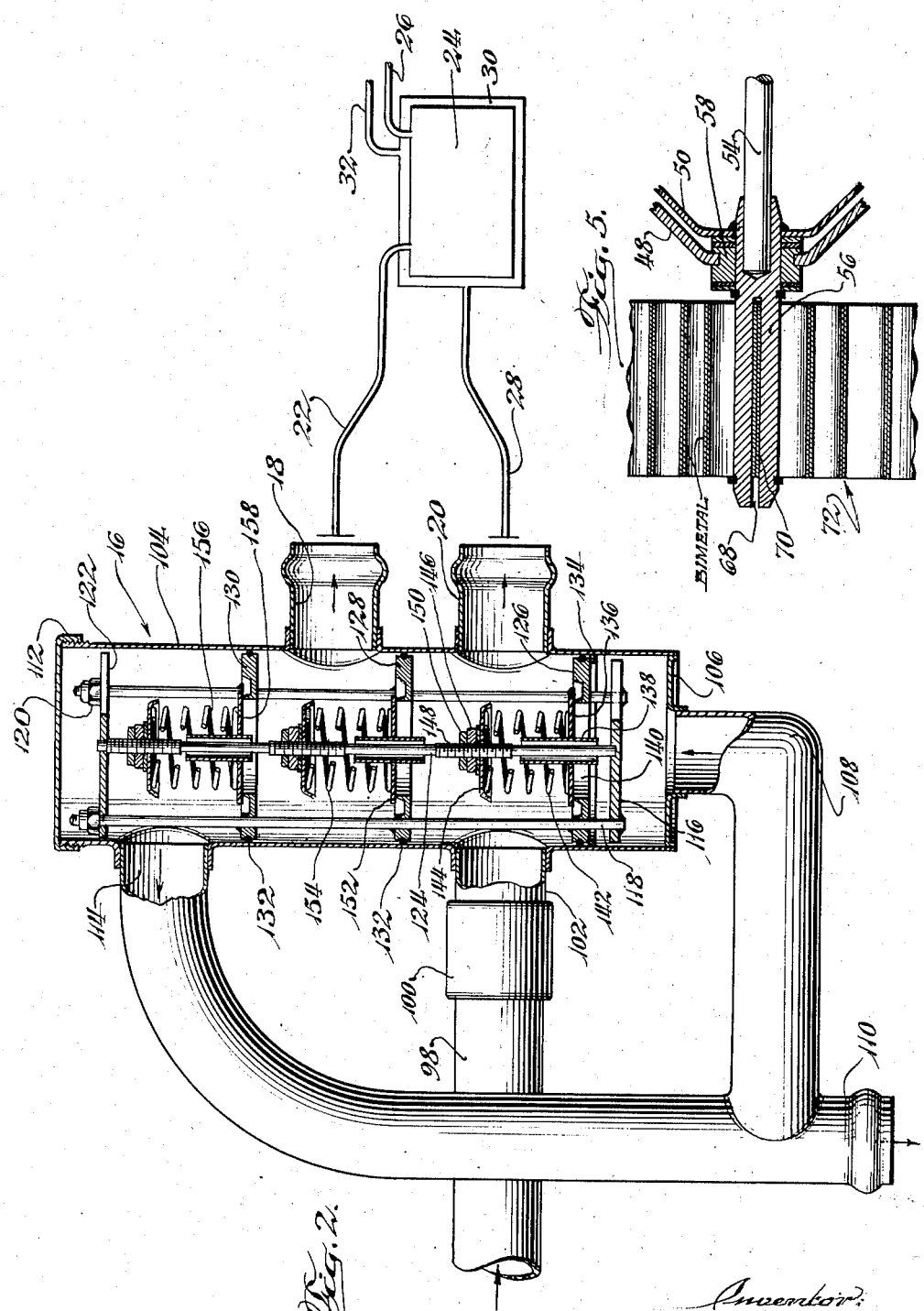

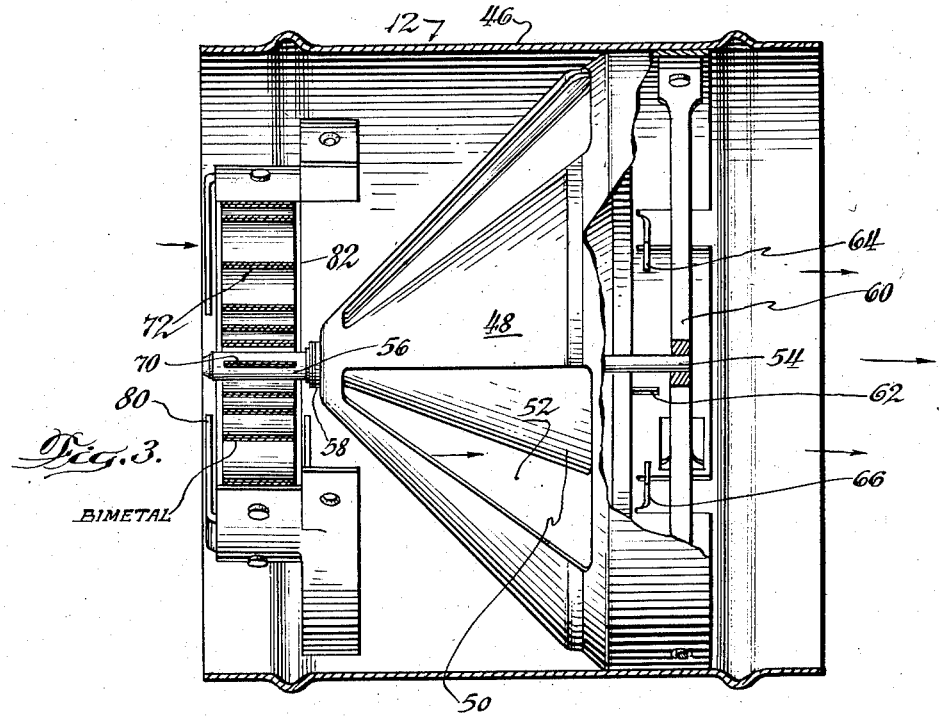
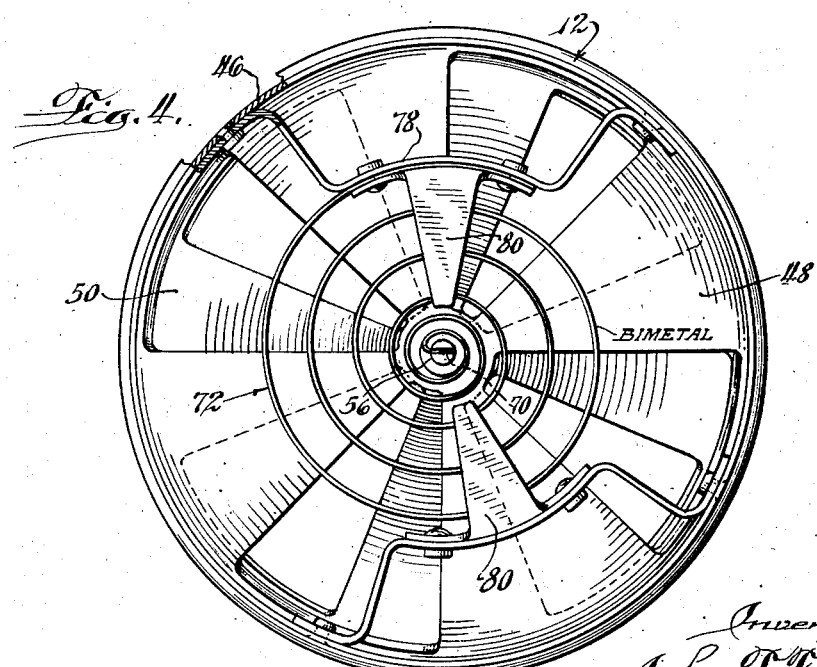

2,801,708
PURGING SYSTEM

John T. Fisher, Indianapolis, Ind., assignor to Stewart-Warner Corporation, Chicago, Ill., a corporation of Virginia Application April 6, 1955, Serial No. 499,689

6 Claims. (Cl. 183—32)

The present invention relates generally to the art of fire and explosion prevention in aircraft, and more particularly to a system for purging fuel vapors and air from regions where an explosive mixture might otherwise accumulate.

Within any aircraft there is much closed space, or substantially closed space, which is not occupied by personnel and within which fuel vapors might under some conditions collect—the fuel bays and fuel cells for instance. Fuel vapor when mixed with air in such spaces presents an explosion or fire hazard. Although this hazard may exist to some extent in any aircraft, it is of course particularly pronounced in military aircraft where damage to the fuel cells may occur as the result of enemy action.

One method for preventing a hazardous condition from arising in such spaces is to purge them by passing therethrough a continuous flow of an inert gas. This inert gas removes the fuel vapor and more importantly purges the oxygen-containing air from the spaces so that a combustible mixture cannot be formed even in the presence of fuel vapor.

Systems for accomplishing this are now in use, one such system being described in the copending application of Donald A. Potter and Henry A. Geisler, for "Purging Gas Generator," Serial No. 324,974, filed December 9, 1952, now Patent No. 2,759,802, dated August 21, 1956. The system there shown, however, produces purging gases by mixing air with fuel taken from the engine supply system and burning this mixture under controlled conditions. Such a system is particularly useful in jet or turbine powered aircraft. In the present arrangement, which is particularly adapted for use in aircraft powered by internal combustion piston type engines, the purging gases in their raw state are taken from the exhaust manifold or exhaust pipe of the engine itself rather than being independently produced. A considerable space and weight saving thus results and much complexity and expense is avoided.

The principal object of the present invention is to provide a novel, inexpensive, small, lightweight, and substantially fool-proof arrangement which is adapted to provide purging gases for use in aircraft and which is adapted to use the exhaust of an internal combustion engine as the source of supply of raw purge gas material.

Still another object is to provide a purged gas system having the above characteristics and which in addition insures that the various spaces to be purged are maintained at appropriate and relatively different pressure levels so as to insure greater safety of the system.

Yet another object is to provide a novel system as indicated above which insures that the purged spaces are not required to sustain either excessively high or excessively low pressures relative to each other or to the ambient.

Still another object is to provide a novel purge gas supply system in which the danger of either excessively high temperatures or excessively low temperatures are insured against under a wide range of operating conditions.

Other objects and advantages will become apparent from the following description of a preferred embodiment of my invention which is illustrated in the accompanying drawings.

In the drawings, in which similar characters of reference refer to similar parts throughout the several views:

Fig. 1 is a somewhat diagrammatic representation of one portion of the system shown from above, with a portion of the structure broken away to illustrate the interior mechanism in longitudinal medial section;

Fig. 2 is a view generally similar to Fig. 1 and constitutes a continuation of the system. Fig. 2 may be considered as essentially an elevational view with a portion of the mechanism broken away so as to reveal the interior in vertical medial section;

Fig. 3 is a longitudinal, medial sectional view through a ventilating air control valve which forms a portion of the subject matter of the present invention, this valve being fragmentarily shown in position in Fig. 1.

Fig. 4 is an inlet end view of the valve shown in Figs. 3 and 4; and

Fig. 5 is a vertical longitudinal sectional view, drawn to larger scale, of a detail of the control portion of the valve of Figs. 3 and 4.

Internal combustion engine exhaust gas is comprised essentially of a mixture of nitrogen and carbon dioxide, although there also will be some carbon monoxide, hydrogen, and oxygen present. Water vapor will also be incorporated in the gases in considerable proportion and some carbon particles will be present.

The composition of aircraft engine exhaust gas, therefore, is such as to make it suitable for use in purging the fuel cells and bays and similar spaces of air and fuel vapor, providing the pressure, temperature and quantity is appropriate, and after the removal of the major portion of the liquid phase water and carbon particles. The products of combustion must be cooled sufficiently so that their use will not damage any of the aircraft structure. This cooling is of course accompanied by condensation of water much of which is readily removable—and takes most of the carbon with it—through the employment of a more or less conventional cyclone type centrifugal separator. The cooled dewatered gases, however, will be saturated and may contain some water in the liquid phase. On the way to the bays and fuel cells and within these spaces some additional cooling and condensation will ordinarily take place, especially when the ambient temperature is low. The result is that if special precautions are not taken, there will be conditions under which the temperature of the purge gases will drop below the freezing point of water. One of the serious problems encountered in systems of this general character, therefore, is preventing the possibility of freezing in the purge gas lines, valves and spaces to be purged.

From the above it will be apparent that the problem is therefore largely one of cooling hot products of combustion to a usable range of temperatures, while on the other hand insuring that these products of combustion will never be so greatly cooled as to bring about the possibility of ice formation. Furthermore, the pressure must not exceed a certain range as otherwise damage may result to the aircraft structure. This will be pointed out in greater detail presently.

In order to keep the weight and space requirements of the equipment to a minimum, extensive use is made of facilities already provided in the aircraft and this introduces a considerable range of problems that might not on first inspection be appreciated. For instance, inasmuch as the source of the raw purge gases is the exhaust manifold of the aircraft engine, the pressure of the gases at this source will vary widely depending largely upon the power output of the engine. Under almost all operating conditions however, this pressure will be sufficient and sometimes will be greatly excessive. There are conditions, however, of short duration under which the pressure at the engine exhaust manifold will be excessively low, and were it not for special provisions in the system, this could result in a hazardous situation.

As will be explained presently, the engine exhaust gases at a very high temperature and must be cooled. This is accomplished in the present instance in a gas-to-air heat exchanger which depends for the cooling ventilating air upon the use of a scoop or ram in the aircraft slip stream. There will be, therefore, a strong tendency toward wide fluctuation in the cooling capacity because of fluctuation in the cooling air rate, its density, and its temperature.

In spite of all these variables, which are subject to rather wide and more or less independent fluctuation, the system which forms the subject matter of the present invention insures practical operation.

The apparatus of the present invention is illustrated and will be described upon the assumption that certain facilities, as indicated above, will be made available within the aircraft in which the system is installed. For instance, a tap into the aircraft engine exhaust manifold will be provided from which exhaust gases at the manifold pressure can be withdrawn for use by the present system. It is also assumed that suitable ventilating air duct work and a ram source will be built into the aircraft and that purge gas lines connected to the spaces to be purged will be in place. These purged spaces will be vented to the atmosphere to provide an ultimate gas outlet from the system.

In describing the present embodiment of the invention, it will be assumed that the spaces to be purged are divided into two classes to be maintained at different pressures. For instance, purge gases will be caused to sweep through the spaces in the fuel cells above the fuel therein at some certain pressure, say, as a typical example, eight inches of water pressure above ambient. The spaces within the bays around the fuel cells and other similar spaces it is intended will be maintained at a somewhat higher pressure, as an example fifteen inches of water pressure above ambient.

Referring now to the drawings in which a structure incorporating the present invention is shown somewhat diagrammatically, the device there illustrated is made up generally of welded heat and corrosion resistant sheet metal, such as stainless steel for instance. At one end of the device, to be referred to for convenience as the front end, an adapter 10 is provided for connection to the duct work which leads to the ventilating air scoop arranged at any convenient place in the aircraft slip steam so that ventilating air flows into the adapter 10. After passing through the system, the ventilating air leaves by way of a regulating valve indicated at 12 in Fig. 1 and shown in greater detail in Figs. 3, 4 and 5. From this valve the ventilating air passes overboard of the aircraft through any suitable duct work connected thereto.

The previously referred to tap into the aircraft engine exhaust manifold is connected by a suitable conduit—or a direct connection—to the gas inlet fitting 14 which is shown in Fig. 1. Ultimately the treated products of combustion, in other words, the purge gases, leave the device by way of a control valve 16, Fig. 2, through two separate outlet fittings 18 and 20. Of these, the fitting 18 is connected by a suitable gas line 22 to the fuel cells or reservoirs, one of which is diagrammatically illustrated at 24. From the fuel cells the purge gases pass overboard of the aircraft through fuel cell vents 26. Purge gases which leave the fitting 20 are connected by a line 28 so as to flow into the bays 30 which surround the fuel cells, and similar spaces, these spaces being vented overboard by outlets indicated at 32.

The air inlet adapter fitting 10 is connected to the end of a generally cylindrical air case 34 the other end of which is connected by an adapter fitting 36 to the inlet end of the previously mentioned control valve 12, these connections as well as other connections between the several units being accomplished in a suitable fashion as by means of a resilient ring and clamping band 38. Between the adapters 10 and 36 the casing 34 encloses a multiplicity of longitudinally extending thin walled metal tubes 40 which extend through openings in tube sheets or header plates at each end of the casing 34, one of these tube sheets being indicated at 44, the one at the other end of the casing being substantially identical. Ventilating air, therefore, flows through the tubes 40 and thence through the valve 12 in its passage from the inlet scoop to the overboard connection.

Referring now more specifically to Figs. 3, 4 and 5, it will be seen that the control valve there shown comprises a cylindrical casing 46 through which the ventilating air flows and that within this casing there are two nested conical valve elements indicated respectively at 48 and 50. The cone 48 at the inlet end, that is toward the left in Fig. 3, is secured around its periphery to the inner wall of the casing 48 as by riveting so as to form a substantially airtight seal. This cone is provided with slotted areas as at 52. As shown there are four of these slots, symmetrically arranged, which extend from a region near the periphery of the cone to a position adjacent the apex thereof. These slots are so proportioned that each slot has approximately the same shape and area as the metal portions between the slots. The rearward cone 50 is substantially identically slotted. The rotational position of the inner cone 50 relative to the fixed cone 48, therefore, determines the pressure drop or flow rate through the valve, since if the valve cone 50 is rotated so that its solid areas are in alignment with the slots 52, very little air will flow through the valve, whereas if the slots in the inner cone 50 are in alignment with the slot 52 a full flow rate is assured.

The inner cone 50 is secured at its apex to a longitudinally extending shaft 54 which at its forward end carries a stub shaft 56 journaled for rotation in a bearing ring 58 carried at the apex of the outer cone 48. The opposite end of the shaft 54 is journaled for rotation at the center of a spider 60 the arms of which extend outwardly so that their ends are secured by the same rivets which attach the cone 48 to the casing 46. The shaft 54 therefore is free to rotate and to carry the inner cone 50 with it between limit stops. These stops are provided by a cut and bent tab 62 which projects inwardly from the periphery of the inner cone 50 in a position to contact a sheet metal tab 64 which extends inwardly from the periphery of the fixed cone 48 when the valve member 50 is rotated to the fully open position and to abut against a similar tab 66 when the valve is in closed position. This arrangement is best seen in Fig. 3.

The forwardly projecting stub shaft 56 is transversely slotted at 68 and receives the inner end 70 of a helical bimetal element indicated generally at 72. The outer end of this bimetal element is attached to a sheet metal bracket 78 attached in turn to the metal housing 46. This bracket 78, as well as a second one essentially identical thereto, is provided with a pair of radially inwardly extending ears 80 and 82. These ears are positioned a short distance in front and in back, respectively, of the bimetal element 72 so as to protect this relatively sensitive element against damage that might affect its calibration.

The bimetal element 72 is so oriented that as the temperature of the air passing through the casing 46 rises, the activity of the heated bimetal element 72 will be such as to rotate the cone 50 toward valve opening position, thereby increasing the air flow rate through the valve. Conversely, a decrease in the temperature of the bimetal element 72 will rotate the valve member 50 toward closed position, thereby reducing the air flow rate.

Exhaust gases from the aircraft engine, which are brought into the device by way of the fitting 14, flow into the space within the casing 34 around the tubes 40 adjacent one end of the heat exchanger. From this position the gases flow back and forth across the tubes in a zigzag fashion as determined by several transverse baffles 84, until the gas reaches the opposite end of the casing 34 where it exits by way of an outlet fitting 86. The exhaust gases, therefore, in making several passes across the cooled tubes 40 on their way between the inlet fitting 14 and the outlet fitting 86, lose much of their heat and leave the heat exchanger at an appropriate temperature. Any water which condenses and collects in the heat exchanger is drained therefrom by way of the fitting 87 which is connected overboard. The ventilating air leaving the heat exchanger will be heated and will affect the bimetal element of the valve 12. Since the valve 12 maintains the temperature of the ventilating air at the outlet of the system at a reasonably constant level, as previously described, it will be understood that whether the rate of flow and temperature of the exhaust gas is high or low, and whether the pressure differential between the ventilating air scoop and the ventilating air outlet is high or low and regardless of the temperature and density of the ventilating air, the exhaust gas will leave the heat exchanger at the fitting 86 at a minimum temperature which is safely above that at which freezing might take place somewhere in the system, and at a maximum temperature below that at which some hazardous condition might occur or some deteriorating effect might be produced upon the aircraft structure.

From the fitting 86 the cooled products of combustion flow tangentially into a longitudinally extending tube 88 so as to have a vortex flow patterned therein. These gases are taken from the opposite end of the tube 88 in an axial direction by way of a fitting 90 which extends into the end of the tube 88 and which therein has a diameter somewhat smaller than the internal diameter of the tube 88, thereby providing an annular space 92 between the inner wall of the tube 88 and the outer wall of the fitting 90. This annular space is connected to an overboard drain line by way of a water outlet fitting 94. This simple structure, therefore, acts as a cyclone separator by precipitating the water droplets and the carbon particles outwardly against the inner wall of the tube 88, with the result that the ultimate outlet for these liquid and solid particles is by way of the drain fitting 94, while the dewatered gas exits by way of the fitting 90 coupled as at 96 to a tube 98 leading in turn, by way of a coupler 100, to an inlet fitting 102 near the bottom of the gas control valve assembly indicated generally at 16.

The control valve 16 is made up of a length of metal tubing 104. The lower end of this tube is closed by a bottom forming member 106 having an outlet spud 108 leading to a vent tube 110 which in turn is connected to lead overboard of the aircraft either directly or, if preferred, the end of this tube can be connected into the ventilating air duct so that any gas leaving the fitting 110 passes overboard along with the heated ventilating air.

At the top, the cylindrical casing 104 is closed by a screw cap, or the equivalent indicated at 112. Near its upper end the casing 104 communicates through an outlet 114 with the previously mentioned overboard tube 110. The gas outlet fitting 20 previously mentioned, which is used for purging the fuel bays, is connected into the housing 104 at about the same level as the inlet fitting 102, whereas the outlet fitting 18 leading to the fuel cells is connected into the housing at a level which is approximately midway between the inlet fitting 102 and the top outlet fitting 114.

A compound valve apparatus is formed as an element which is removable from the casing as a unit for adjustment, this valve mechanism including a spider 116 which is shown as being positioned at a level just above the bottom cap 106. Three equally spaced rods 118 extend upwardly from this spider in parallel relationship and have their lower ends secured to the spider as by brazing for example. At their upper ends these rods are threaded and carry nuts 120 which press downwardly upon a top spider 122. A central rod 124 extends vertically between the spiders along the axis of the casing 104 and is maintained in position by the clamping action of the two spiders 122 against the ends thereof.

The vertically extending rods 118 carry three ring type headers or valve seats 126, 128 and 130 which are secured to the rods 118 which pass therethrough, by brazing for instance. These valve seats are arranged so that the one at 126 is below the inlet 102 and outlet 20, the seat 128 is between the outlets 20 and 18, and the third seat 130 is at a level between the outlets 18 and 114. Each of these valve seats has an external diameter which is slightly smaller than the internal diameter of the casing 104 and each of these seats is grooved at its periphery to receive a resilient O-ring 132. The structure, therefore, can be inserted into the open upper end of the casing and pushed downwardly until the upper ends of the rods 118 are below the level of the cap 112 and the lowermost valve seat 126 is abutted against a stop ring 134 secured to the inner surface of the housing 104.

A circular poppet valve disc 136 is secured at its center to a short sleeve 138 which forms a loose guiding fit with the central rod 124. This disc 136 is positioned above the valve seat 126 with its lower surface thereagainst so as to close a central valve port 140. It is urged downwardly by a coil spring 142 the upper end of which is based against a spring keeper 144 held in place by a nut 146 secured to a short threaded section 148 of the rod 124. By rotating the nut 146 relative to the rod 124 the compression of the spring 142 can be determined and therefore the pressure differential necessary to open the valve is adjustable as desired. Final adjustment is fixed by a locking nut 150 threaded to the section 148 in a position just above the nut 146 so that these two nuts can be jammed together.

In order to slip the nuts 150 and 146 over the unthreaded portion of the rod, it is of course necessary for the threaded portion to have a somewhat larger diameter. Since the sleeve 138 also slides over this threaded portion in order to arrive at its final position, it will fit the rod 124 somewhat loosely, but this is no appreciable disadvantage, since the flow rate of the gas through the system is in sufficient volume to make this amount of leakage between the sleeve 138 and the stem 124 inconsequential at the small pressure differentials which prevail in the system.

The middle valve seat 128 supports a poppet valve plate 152 which is urged downwardly by an adjustable coil spring 154. Similarly, an adjustable coil spring 156 urges a poppet valve plate 158 against the upper surface of the top valve seat 130. Inasmuch as the construction of all three valves is substantially identical, no detailed description of these two valves is necessary.

With this construction the cage, made up of the rods 118 and spiders 116 and 122 can be preassembled as a unit with the three valves and all valves can be adjusted in a convenient test fixture. The cage and valves then can be inserted into the housing 104 from the top and the cap 112 used to close the opening. The three O-rings at 132 serve to prevent rattling of the valve mechanism within the housing 104 and of course also aid in preventing communication between the several spaces except by way of the ports.

The valve spring 156 is so adjusted that whenever the pressure in the plenum chamber space between the valve seats 130 and 128 exceeds eight inches of water pressure, the poppet valve 158 will be lifted from its seat so as to permit the excess gas to escape into the chamber at the top of the housing 104 and thence overboard by way of the outlet 114. The pressure at the outlet 18 and in the fuel cells 24 is therefore maintained at approximately eight inches of water above ambient. The valve spring 154 is adjusted to a pressure such that the poppet valve 152 will be lifted from its seat to permit gas to escape from the plenum chamber between the valve seats 128 and 126 into the space between the valve seats 128 and 130—the latter space being at a pressure of eight inches of water— whenever the pressure in the space communicating with the outlet 20 exceeds fifteen inches of water. The bays around the fuel cells and similar spaces are therefore maintained ordinarily at a pressure of fifteen inches of water. The result of this dynamic action is that the external pressure the fuel cells are required to support against collapse is never more than seven inches of water. Furthermore, even though the pressure within the cells is above atmospheric, this does not tend to cause the cells to expand since the external pressure is ordinarily greater than the internal pressure. Additionally any leaks which develop between the cells 24 and bays 30 will produce flow from the bays to the cells rather than the reverse.

During dynamic operation of the system, therefore, the line 28 to the bays will receive purge gases at an appropriate rate to maintain a pressure within the bays of fifteen inches of water, whereas the line 22 leading to the fuel cells will receive purge gases at a rate sufficient to insure a positive pressure within these cells at eight inches of water pressure, with the excess passing around the poppet valve plate 153 and thence overboard of the aircraft. This condition is ordinarily insured, since purge gases usually will be supplied in excess quantity, so that during normal operation valve plates 152 and 153 will both continuously be off their seats somewhat.

There are conditions of operation, usually of quite short duration, during which the line 98 operates at a negative pressure. This can be caused for instance by a low rate of gas supply to the exhaust manifold and the aspirating effect produced by the exhaust outlet. Under some conditions this negative pressure might be great enough to cause partial collapse or other damage to the walls of the purged spaces. The system insures against any such possibility since a slight negative pressure, of the order of say twenty-five percent of that which the cells and bays will withstand, causes lifting of the poppet valve plate 136, thereby permitting air to flow reversely through the conduit 110 and by way of the line 98 to the engine exhaust manifold. The pressures in the lines 28 and 22 therefore cannot fall appreciably below atmospheric.

From the above it will be seen that through inherent operation of this system, exhaust gases are taken from the engine exhaust manifold, are cooled and dewatered by means of the heat exchanger and water trap which form the subject matter of Fig. 1, with sufficient cooling and the avoidance of excess cooling being insured through operation of the automatic ventilating air flow controller illustrated in Figs. 3, 4 and 5, and that the cooled dewatered gases arrive at the fuel cells and bays at appropriate relative positive pressures under almost all operating conditions of the aircraft and that excessive negative pressure in the fuel cells and bays is avoided. Furthermore, it will be appreciated that this entire activity is accomplished without the need for electrical control equipment, but purely by means of mechanical devices which are relatively simple in their constructional features and which inherently operate in a satisfactory manner in accordance with well understood physical principles. Furthermore, these are no sliding or running fits anywhere in the system which need to be of a precise nature or which require lubrication other than perhaps a little colloidal graphite at the bearings for the air control valve shaft 54—56, and the system therefore is reliable in carrying out its function.

The specific pressures given above are for the purpose of illustration only and should not be considered as limitative, since other pressure ranges could be used within the system if desired.

From the above description of a preferred embodiment of my invention, it will be appreciated that modifications and variations can be made without departing from the spirit or scope of the invention and that, therefore, the scope of this invention is to be measured by the scope of the following claims.

Having described my invention, what I claim as new and useful and desire to secure by Letters Patent of the United States is:

1. A gas control valve assembly comprising a cylindrical casing, means forming a first opening substantially at one end thereof, a second opening substantially at the other end thereof, a third opening between said first and second openings and a fourth opening between said third opening and said first opening, a valve cage adapted to slide into said casing in an endwise direction, said cage being provided with three poppet valves so disposed that when said cage is within said casing the first of said valves is between said second and said third openings and is adapted to open when the pressure of said second opening exceeds that of said third opening by a predetermined amount, the second of said valves is between said third and said fourth opening and is adapted to open when the pressure at said third opening exceeds that at said fourth opening by a predetermined amount, the third of said valves is between said fourth and said first opening and is adapted to open when the pressure at said fourth opening exceeds that at said first opening by a predetermined amount, conduit means for connecting together said first and said second openings, and conduit means for providing an inlet fitting interconnected with said third opening independently of said valves.

2. A gas control valve assembly comprising a cylindrical casing, means forming a first opening substantially at one end thereof, a second opening substantially at the other end thereof, a third opening between said first and second openings and a fourth opening between said third opening and said first opening, a valve cage adapted to slide into said casing in an endwise direction, said cage being provided with three poppet valves so disposed that when said cage is within said casing the first of said valves is between said second and said third openings and is adapted to open when the pressure of said second opening exceeds that of said third opening by a predetermined amount, the second of said valves is between said third and said fourth opening and is adapted to open when the pressure at said third opening exceeds that at said fourth opening by a predetermined amount, the third of said valves is between said fourth and said first openings and is adapted to open when the pressure at said fourth opening exceeds that at said first opening by a predetermined amount, means for maintaining said first and said second openings at atmospheric pressure, and means providing an inlet continuously communicating with said third opening.

3. In an aircraft fuel system, the combination of means defining a first enclosed space adapted to serve as a fuel reservoir, means defining a second space generally enclosed and at least partially surrounding said first space, a purge gas supply and pressure control valve assembly defining a first plenum chamber connected to one of said spaces and a second plenum chamber connected to the other of said spaces, purge gas supply means connected to said second plenum chamber, a first unidirectional pressure relief valve connected between said second plenum chamber and said first plenum chamber and having spring biased automatic control means responsive to differential pressure between said chambers and preset to connect said chambers through the valve only when the pressure in the second chamber exceeds that in the first chamber by a predetermined value, means comprising a second unidirectional pressure relief valve connecting said first plenum chamber to the ambient atmosphere and including spring biased automatic control means responsive to differential pressure across said second valve and preset to connect said first plenum chamber to the ambient atmosphere only when the pressure in the first plenum chamber exceeds that of the ambient atmosphere by a predetermined value, said two valves being independently operative each with respect to the other, means including a third unidirectional pressure relief valve independent of said first and second valves and mounted to connect the ambient atmosphere to said second plenum chamber, and said third pressure relief valve including spring biased automatic operating means therefor responsive to differential pressure across said third valve to connect the ambient atmosphere to said second plenum chamber only when the pressure of the ambient atmosphere exceeds that within the second plenum chamber by a predetermined value.

4. In an aircraft fuel system, the combination of means defining a fuel reservoir, means defining a substantially enclosed space at least partially surrounding said reservoir, a purge gas supply and pressure control valve assembly defining a first plenum chamber connected to said reservoir and a second plenum chamber connected to said space, a first unidirectional relief valve connecting said second plenum chamber to discharge gas into said first plenum chamber and having spring biased automatic control means responsive to differential pressure between said chambers and preset to connect said chambers through the valve only when the pressure in the second chamber exceeds that in the first chamber by a predetermined value, means comprising a second unidirectional relief valve connected to vent said first plenum chamber to the ambient atmosphere and including spring biased automatic control means responsive to differential pressure across said second valve and preset to vent said first plenum chamber to the ambient atmosphere only when the pressure in the first plenum chamber exceeds that of the ambient atmosphere by a predetermined value, said two valves being independently operative each with respect to the other, means including a third unidirectional pressure relief valve independent of said first and second valves and mounted to connect the ambient atmosphere to said second plenum chamber, said third pressure relief valve including spring biased automatic operating means therefor responsive to differential pressure across said third valve to connect the ambient atmosphere to said second plenum chamber only when the pressure of the ambient atmosphere exceeds that within the second plenum chamber by a predetermined value, means forming a source of hot moisture laden purge gas, and means connecting said source of purge gas to said second plenum chamber independently of said valves and including automatically controlled heat exchanger means for reducing the temperature of the purge gas to a predetermined level and means for extracting excess moisture from the purge gas.

5. For supplying two separate plenum spaces with purge gas under limited pressures at two different pressure levels and limiting the differential pressure between the respective spaces and the outside thereof, the combination of a cylindrical casing, an elongated frame shaped for removable insertion longitudinally into said casing, three header assemblies affixed to said frame in transverse longitudinally spaced relation thereto and shaped to coact with said casing upon insertion of said frame into the casing to define within the casing two plenum chambers on opposite sides of the intermediate header assembly, said casing defining two openings therein communicating with said respective plenum chambers and adapted for connection with spaces external thereof, said intermediate header assembly including a unidirectional pressure relief valve having an inlet communicating with one of said plenum chambers and an outlet communicating with the other plenum chamber and comprising spring biased control means responsive to differential pressure between said chambers to connect said one chamber to said other chamber only when the pressure in the former exceeds that in the latter by a predetermined value, the end header assembly contiguous with said other plenum chamber including a unidirectional pressure relief valve having an inlet end communicating with said other plenum chamber and an outlet end, means for connecting the outlet end of said last mentioned valve to the ambient atmosphere, said last mentioned valve including spring biased control means responsive to differential pressure across the valve and preset to open said last mentioned valve only when the pressure within said other plenum chamber exceeds the ambient atmosphere pressure by a predetermined value, the end header assembly contiguous with said one plenum chamber including a unidirectional pressure relief valve having an outlet side communicating with said one plenum chamber and having an inlet, means connecting the said last mentioned valve inlet with the ambient atmosphere, said last mentioned valve including spring biased control means responsive automatically to differential pressure across the last mentioned valve to open said last mentioned valve only when the ambient atmosphere pressure exceeds the pressure within said one plenum chamber by a predetermined value, and means defining a purge gas inlet communicating with said one plenum chamber.

6. For supplying two separate plenum spaces with purge gas under limited pressures at different pressure levels and limiting the differential pressure between the respective spaces and the outside thereof, the combination of a straight elongated casing; an elongated cage adapted to fit removably into said casing and including an elongated cage frame, three centrally open headers fixed to said cage frame in transverse longitudinal spaced relation thereto, three valve members disposed in covering relation to the central openings in said respective headers to open away therefrom toward one and the same end of said cage frame, a central longitudinal stem on said cage frame, three spring seats adjustably secured to said stem for longitudinal adjustment therealong, said seats being longitudinally spaced along said stem from said respective valve members toward said one end of said cage frame, and three compression springs inserted between said respective spring seats and said respective valve members to urge the latter toward closing position in relation to said respective headers; the outer peripheries of said respective headers being adapted to form upon insertion of said cage into said casing effective fluid seals with the inner surface of the casing whereby the headers together with said valves coacting therewith partition an intermediate portion of the casing into two plenum chambers, means on said casing defining two openings communicating directly with said respective plenum chambers and adapted for connection with spaces to be supplied with purge gas, means defining a purge gas supply inlet communicating continuously with said plenum chamber more remote from said one end of said cage frame, and means connecting opposite ends of said casing beyond said respective plenum chambers with the ambient atmosphere.

References Cited in the file of this patent
UNITED STATES PATENTS

| | | |
|---|---|---|
| 1,786,199 | Ferguson | Dec. 23, 1930 |
| 1,998,223 | Czarnecki | Apr. 16, 1935 |
| 2,266,947 | Arndt | Dec. 23, 1941 |
| 2,277,491 | Huber | Mar. 24, 1942 |
| 2,395,941 | Rockwell | Mar. 5, 1946 |
| 2,496,577 | Cahill | Feb. 7, 1950 |